R. Y. ANDERSON.
Safety Attachment for Chains.
No. 218,211. Patented Aug. 5, 1879.
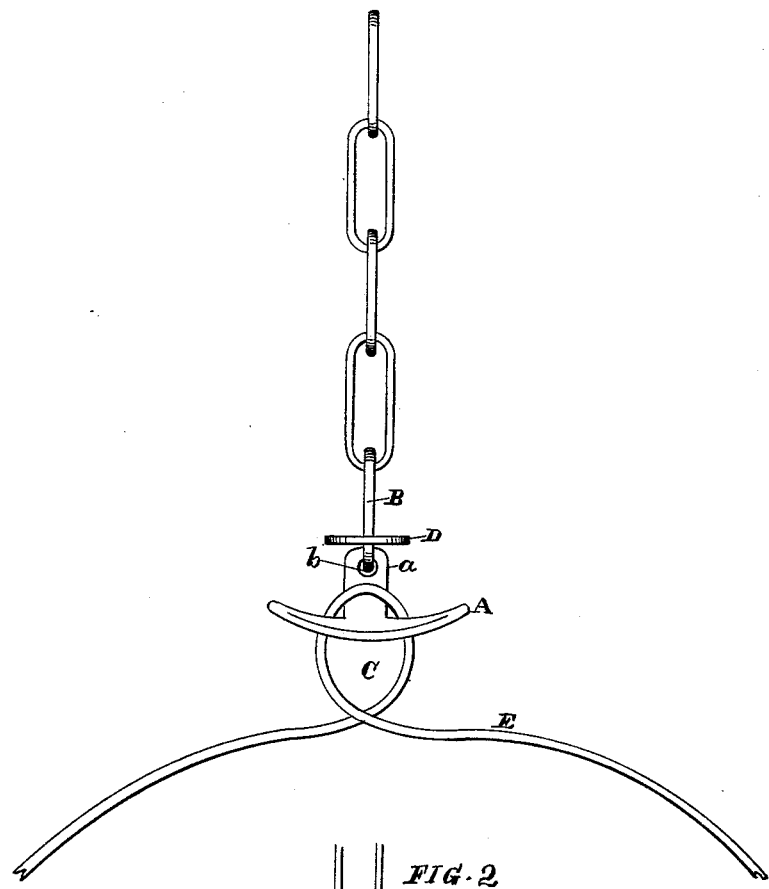
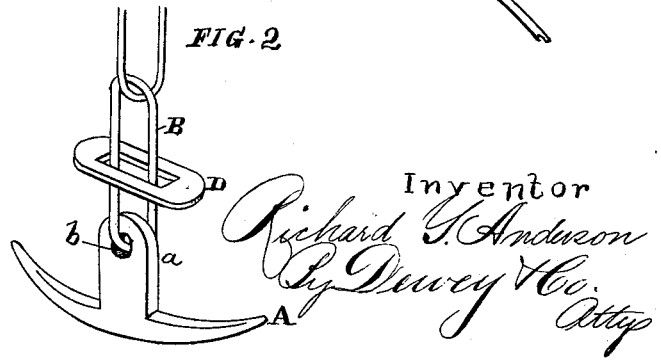

UNITED STATES PATENT OFFICE.

RICHARD Y. ANDERSON, OF SANTA CLARA, CALIFORNIA.

IMPROVEMENT IN SAFETY ATTACHMENTS FOR CHAINS.

Specification forming part of Letters Patent No. 218,211, dated August 5, 1879; application filed May 3, 1879.

*To all whom it may concern:*

Be it known that I, RICHARD Y. ANDERSON, of the town and county of Santa Clara, and State of California, have invented a Safety Attachment for Chains; and I hereby declare the following to be a full, clear, and exact description thereof, reference being made to the accompanying drawings.

My invention relates to an improved safety attachment for chains, which is intended more particularly to make connections between chain or cable and mining buckets or cars, but may serve for other similar purposes as well.

It consists in forming the shank of the link or hook of considerable length, and placing the hole through which the chain-link passes near the outer end of said shank, so that the hook will at all times swing transversely to the chain on which it hangs, thus reducing the liability of disengagement of the hook.

It further consists in the use of a plate sliding on the chain-link above the hook, which prevents more than one link of the chain passing through the eye of the bail, as is more fully described in the accompanying drawings, in which—

Figures 1 and 2 are views of my safety-hook.

Let A represent an ordinary T link or hook of the same general shape as those used for connecting traces and whiffletrees. My link, however, has the shank $a$ extended for about the length of one of the sides, and is considerably longer than that usually formed on said links. The hole $b$, through which the chain-link passes in securing the hook to the chain, is made at the outer instead of the inner end of the shank, as shown, so that there will be less liability of the hook swinging up in line with the chain than there is when the chain is attached so near the center of the hook.

The chain-link B, in which the hook is swung, carries a slotted plate, D, this plate inclosing the chain-link above the shank of the hook and sliding freely on said link, for the purpose hereinafter described.

The eye C of the bail E of the bucket is preferably made oblong or oval in form, being somewhat longer than wide, as shown, its width not being so great as the length of the shank $a$ of the hook. By constructing the eye C in this shape, the hook cannot be passed through it except lengthwise the eye, where there is room for the shank; and as the shape of the eye is such that the hook usually swings transverse to its greatest length, there is less liability of the hook being accidentally drawn out of the eye than would be the case could the hook be passed through in any manner.

To remove the hook from the eye, the plate is drawn up the chain-link as far as possible, and the chain-link drawn through the eye as far as the plate will permit. Then the hook is thrown lengthwise and into the chain-link, and by passing it lengthwise through the eye it will come out, and the bucket and bail may be removed. The link cannot be drawn out transversely through the eye, as the shank cannot pass through in that way.

In connecting the hook with the bail, the hook is placed lengthwise the chain-link, the plate drawn back, and hook inserted and turned. The sliding plate then drops down to the lower end of the link, in which it slides.

The main object of this plate is to prevent the chain passing farther through the eye than its first link. Occasionally, in lowering a bucket in a mine, the chain will overhaul through the eye of the bail, and a lot of chain will have to be drawn through the eye again before the hook catches, bringing up with a jar and strain. By using this plate the chain cannot pass down through the eye, and this defect is remedied.

By elongating the shank of the hook, when the hook is free it will hang transversely to the chain, and not sometimes in line with it, as is the case when it is pivoted on the chain at a point equidistant between its two ends. The weight of the hook is sufficient to cause it to hang in a horizontal position when swung from the end of the elongated shank. There is, therefore, less liability of the hook disengaging itself from the bail than when it can swing in line with its chain-link.

The eye of the bail is preferably curved slightly, as shown, so that the center of gravity will be over the center of effort, and some side strain be taken off the link holding the hook.

By having the shank elongated, as shown, and the chain-link connected at its outer end, no strain is ever brought on the chain-link itself, but always on the hook or shank, as the shank will at all times protrude through the chain-links.

Having thus described my invention, what I claim as new, and desire to secure by Letters Patent, is—

The hook A, plate D, and link B, combined and arranged substantially as shown.

In witness whereof I have hereunto set my hand.

RICHARD Y. ANDERSON.

Witnesses:
  CHAS. G. YALE,
  S. H. NOURSE.